(12) United States Patent
Mauti (10) Patent No.: US 7,770,703 B2
(45) Date of Patent: Aug. 10, 2010

(54) LOCK-UP TORQUE CONVERTER AND METHOD OF LOCKING UP A TORQUE CONVERTER

(76) Inventor: Renato Mauti, 21159 Robinson St., Farmington Hills, MI (US) 48336

( * ) Notice: Subject to any disclaimer, the term of this patent is extended or adjusted under 35 U.S.C. 154(b) by 590 days.

(21) Appl. No.: 11/697,719

(22) Filed: Apr. 7, 2007

(65) Prior Publication Data

US 2008/0245635 A1    Oct. 9, 2008

(51) Int. Cl.
    *F16H 45/02*    (2006.01)
(52) U.S. Cl. .................................... 192/3.29; 192/30 V
(58) Field of Classification Search ........................ None
    See application file for complete search history.

(56) References Cited

U.S. PATENT DOCUMENTS

| | | | |
|---|---|---|---|
| 3,252,352 A | 5/1966 | General et al. | |
| 3,485,328 A | 12/1969 | Bilton | |
| 4,063,623 A | 12/1977 | Ivey et al. | |
| 4,437,551 A | 3/1984 | Gimmler et al. | |
| 4,926,988 A | 5/1990 | Kundermann | |
| 5,388,678 A * | 2/1995 | Murata | 192/3.29 |
| 6,006,878 A * | 12/1999 | Macdonald et al. | 192/3.29 |
| 6,076,642 A | 6/2000 | Illig et al. | |
| 6,508,345 B1 | 1/2003 | Yoshimoto et al. | |
| 6,725,988 B2 | 4/2004 | Bauer et al. | |
| 2006/0124420 A1* | 6/2006 | Ackermann | 192/3.29 |
| 2008/0023286 A1* | 1/2008 | Matsumoto et al. | 192/3.29 |

OTHER PUBLICATIONS

Written Opinion of the International Searching Authority for PCT/US2008/059451.

* cited by examiner

*Primary Examiner*—Rodney H Bonck
*Assistant Examiner*—Ryan Dodd
(74) *Attorney, Agent, or Firm*—Steve M. Clemmons (57) ABSTRACT

A torque converter having an internal lock-up clutch which is activated by the elastic expansion or ballooning of the torque converter housing. This ballooning occurs due to the increased internal fluid pressure within the torque converter.

19 Claims, 7 Drawing Sheets

LOCK-UP TORQUE CONVERTER AND METHOD OF LOCKING UP A TORQUE CONVERTER

FIELD OF THE INVENTION

This invention relates to automobile torque converters. More particularly, to torque converters having a lock-up clutch. This invention utilizes the deformation of the torque converter's outer cover to apply a clutch piston and lock the cover/impeller to the turbine. This deformation is caused by increased internal fluid pressure within the torque converter.

BACKGROUND OF THE INVENTION

A torque converter is a type of hydrodynamic (fluid) drive used to transfer rotating power from a prime mover, such as an internal combustion engine or electric motor, to a rotating driven load. A torque converter has at least three rotating elements: the pump or impeller, which is mechanically driven by the prime mover; the turbine, which drives the load; and the stator, which is interposed between the impeller and turbine so that it can alter drive fluid flow returning from the turbine to the impeller.

Currently, many automotive torque converters include a lock-up clutch to improve cruising power transmission efficiency. The application of the clutch locks the turbine to the impeller, causing all power transmission to be mechanical, thus eliminating losses associated with the fluid drive. These conventional torque converters, however, are both expensive and complicated. The lock-up clutches, in particular, require a separate hydraulic fluid circuit to move a slidable piston which has friction plates that allow the torque converter to lock up.

Additionally, these conventional systems often use a hollow turbine output shaft (i.e., the transmission input shaft) to supply the clutch's operating fluid. This hollow output shaft is an inherent weak point of these prior art automatic transmissions. This is particularly true in high torque and/or high RPM applications, such as racing.

Furthermore, if a user wishes to adapt a vehicle that ordinarily does not have a lock-up torque converter, conventional systems require the removal of the entire transmission or expensive modifications to the transmission.

Still further, in all torque converters, rotation generates centrifugal pressure within the torque converter housing (i.e., the impeller's outer shell and front cover) which results in expansion or "ballooning" of the housing. Ballooning is ordinarily a significant problem for conventional torque converters as this growth or expansion of the housing can result in catastrophic failure, such as bursting, under high RPMs or high torque. This ballooning also results in undesirable thrust imparted axially along the crankshaft.

Conventional torque converter designs seek to eliminate or reduce ballooning by using thicker and/or stronger housing materials and by providing additional bracing with so-called anti-ballooning plates which are externally mounted to the housing.

The present invention, takes advantage of torque converter ballooning in the elastic range by having this centrifugally enhanced internal pressure activate a lock-up clutch. The result is a torque converter that ultimately has reduced ballooning. The lock-up clutch is mated to an internal load piston which operates as an internal anti-ballooning plate; whereby the converter trades ballooning for lock-up capacity.

Some prior art references pertaining to lock-up type torque converters which rely on centrifugal forces to activate the clutch include U.S. Pat. No. 4,063,623 issued Dec. 20, 1977 to John Saxon Ivey et al. for "Fluid Coupling with Centrifugal and Torque Responsive Lock Up Clutch"; U.S. Pat. No. 3,465,328 issued Dec. 23, 1967 to John Bilton for "Fluid Coupling with Centrifugal Lock Up Clutch"; U.S. Pat. No. 3,252,352 issued May 24, 1966 to Norman T. General et al. for "Hydrokinetic Power Transmission Mechanism"; and U.S. Pat. No. 6,508,345 issued Jan. 21, 2003 to Tokuji Yoshimoto et al. for "Lock Up Clutch for Torque Converter".

Generally such prior art cannot be readily adapted to vehicle transmissions that do not have a lock-up clutch. Further, these prior art systems do not disclose the novel use of torque converter ballooning to activate the lock-up clutch.

SUMMARY OF THE INVENTION

The broad purpose of the present invention is to provide a lock-up torque converter that uses the elastic deformation of the torque converter housing caused by internal fluid pressure to activate at least one clutch.

As discussed above, pumping losses within a torque converter reduce efficiency and generate waste heat. In modern automotive applications, this problem is commonly avoided by use of a lock-up clutch that physically links the impeller and turbine, effectively changing the converter into a purely mechanical coupling. The beneficial result is no slippage, and therefore virtually no power loss as the lock-up clutch bypasses the torque converter, allowing a 1-to-1 speed ratio between the prime mover and the transmission. This increase in efficiency also allows better performance and fuel economy.

Due to the prevalence of non-lock-up torque converters, such as General Motors' Turbo Hydramatic, in automobile racing, hot-rodding, street-rodding, and vintage automobile restoration, there is a need for adapting these torque converters to be able to lock-up.

It is an advantage of the present invention to provide a lock-up torque converter that utilizes the elastic ballooning of its housing to actuate an internal clutch to frictionally lock the housing to the turbine.

It is another advantage of the present lock-up torque converter to provide an internal load piston that is rigidly coupled to the torque converter housing near the load hub; the piston extends radially toward the outermost walls of the housing. A drive member is fixed to the turbine and is proximate to the outermost end of the load piston. Complementary friction surfaces on the piston and turbine driver allow the torque converter to lock-up when the housing balloons during operation.

It is still another advantage of the present invention to readily adapt a non-lock-up torque converter into a lock-up torque converter, without further modification to the vehicle's drive train and without replacing the transmission.

It is yet another advantage of the present invention to provide a lock-up clutch contained within a torque converter that does not require an additional flow circuit to activate the clutch. Another advantage garnered by eliminating the need for additional flow circuits which feed the lock-up clutch is that a more robust solid output shaft to the transmission may be used.

It is still yet another advantage of the present invention to provide a method of locking a torque converter's impeller and housing to its turbine by elastically expanding the housing through internal fluid pressure. This expansion causes a load piston mounted to the housing to frictionally mate with a drive member fixed to the turbine.

Still further objects and advantages of the invention will become readily apparent to those skilled in the art to which the invention pertains, upon reference to the following detailed description.

BRIEF DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
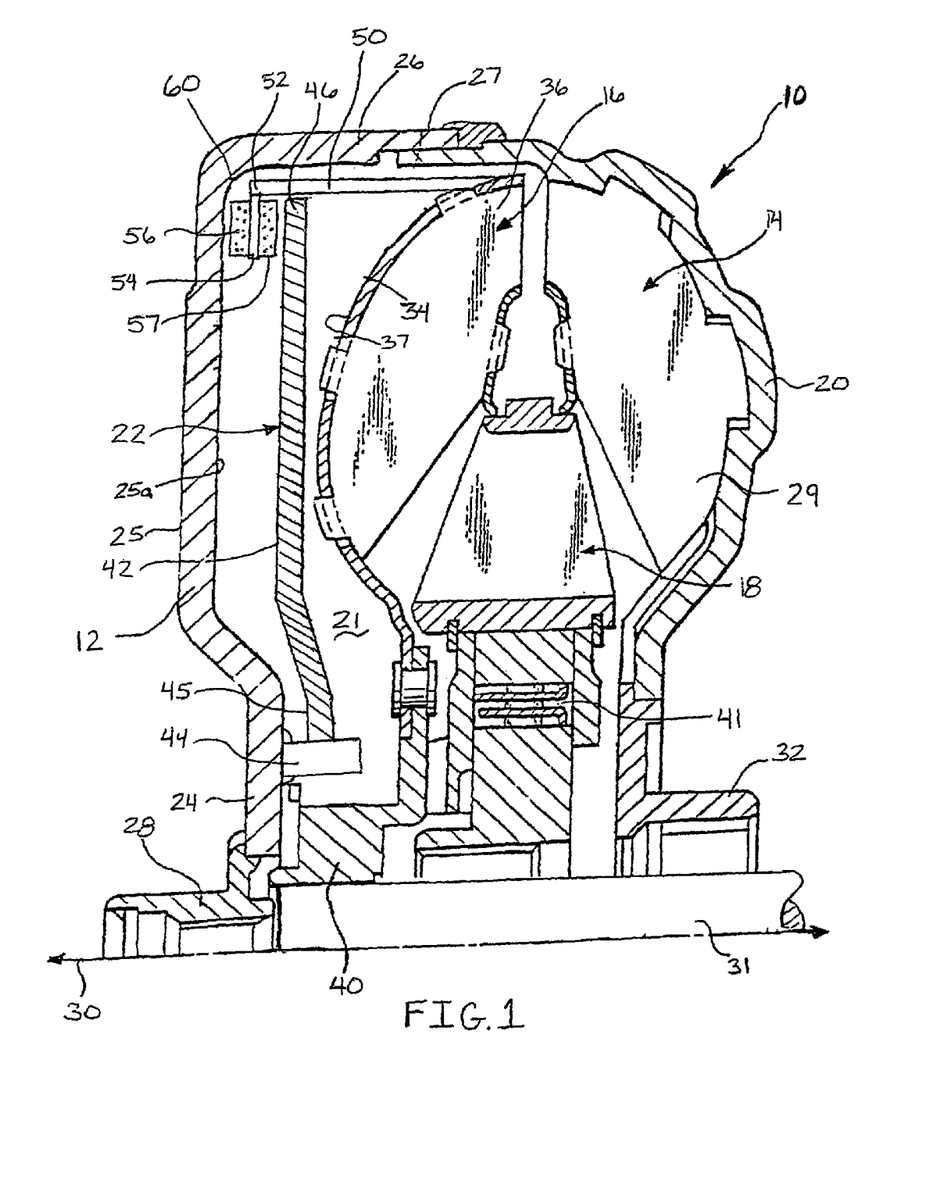
FIG. 1 is a partial cross-sectional view of a torque converter according to a first embodiment of the present invention.

Referring now to FIG. 1, a torque converter 10 is shown, in half cross-section. Torque converter 10 includes a front cover 12, a pump impeller 14, a turbine 16, and a stator 18. Front cover 12 and the outer shell 20 of impeller 14, cooperate to define a hydraulic pressure chamber 21. Torque converter 10 also includes a lock-up clutch 22, which is fixedly mounted to the front cover 12 within hydraulic pressure chamber 21.

Front cover 12 includes a center portion 24, a front wall 25, an outer peripheral wall portion 26 and an impeller connecting portion 27. A center hub 28 having an axis 30 which is identical to a crank shaft of the engine (not shown). This front cover hub 28 is generally ring shaped and is fixed or integrally stamped to the front cover 12 at the center portion thereof.

The peripheral wall 26 runs concentric to hub 28 and axis 30. In the preferred embodiment, the hub 28 and impeller 14 are fixed to the front cover 12 by conventional means, such as welding and/or mechanical fasteners. In one embodiment, the inner diameter of the peripheral wall 26 is slightly enlarged at the end to form the connecting portion 27 at which the impeller 14 is engaged.

As shown in FIG. 1, the pump impeller 14 is integrally connected to the front cover 12. The impeller 14 includes an outer shell 20 to which a plurality of blades 29 are mounted. The outer shell 20 rotates about both a stator shaft (not shown) and an output shaft 31 (e.g., a transmission input shaft) at a ring-shaped impeller hub 32 which is axially aligned with axis 30. Hub 32 is fixed to shell 20 by conventional means, such as welding.

Torque converter 10 also includes a turbine 16. Turbine 16 includes a turbine shell or runner 34 which retains a plurality of blades 36 that face toward impeller blades 29. It should be appreciated that the side 37 of shell 34 that is opposite to blades 36 faces front cover 12. Turbine shell 34 is connected to the output shaft 31 which is connected to the transmission (not shown) through a central turbine hub 40.

Torque converter 10 also includes a stator 18 which is disposed between the impeller 14 and the turbine 16 and is supported by a one-way clutch 41.

Lock-up clutch 22 includes at least one generally disc-shaped load piston or plate 42 inside chamber 21 that is mounted to front cover 12 concentric to axis 30. Piston 42 is fixedly mounted to at least one projection 44 which extends into chamber 21 from the inner surface 25a of front wall 25. It should be appreciated that projection 44 may be a single ring or tube extending from front cover 12 concentric to axis 30 or may comprise a plurality of studs or flanges that project from front cover 12 into chamber 21 radially equidistant to axis 30.

Importantly, projection 44 is mounted to front cover 12 proximate to central hub 28. Piston 42 is fixed to projection 44 in a generally cantilevered relationship where the radially inward portion 45 of piston 42 is mounted to projection 44, while the outer portion 46 remains substantially unsupported when the torque converter is in a non-locked up state. The end of outer portion 46 is preferably proximate to outer peripheral wall 26.

Figure 2:
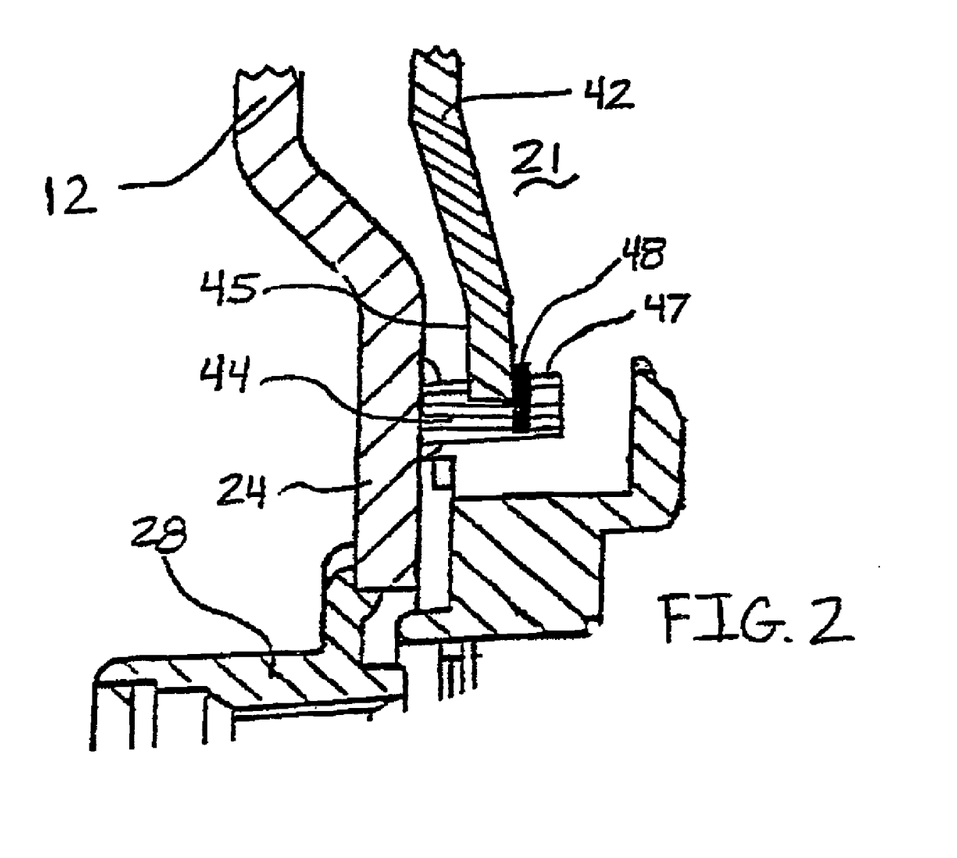
FIG. 2 is an enlarged view of one embodiment of the projection coupling the load piston to the front cover.

In one embodiment, shown in FIG. 2, projection 44 may have splines 47 along its length which cooperate with complementarily-shaped splines on the inner end of each piston 42. In this embodiment, the load piston 42 may be moved along the length of projection 44 to adjust the clearance between adjacent clutch frictional surfaces. To allow for this adjustment, selective thickness snap rings 48 or a snap ring with selective thickness shims to retain the piston 42 along projection 44.

Lock-up clutch 22 further includes a drive member 50 which projects from and is fixed to side 37 of turbine shell 34. As shown in the embodiment illustrated in FIG. 1, drive member 50 extends toward front wall 25 generally perpendicular to piston 42. Drive member 50 extends between the outer portion 46 of piston 42 and outer wall 26. Drive member 50 terminates at a front end 52 that is in close proximity to inner surface 25a.

A friction plate 54 projects from drive member 50 between piston 42 and surface 25a. Friction plate 54 is preferably splined or keyed to drive member 50 and runs parallel to the outer portion 46 and includes sections of friction material 56, 57 bonded to opposite sides of plate 54. In the embodiment illustrated in FIG. 1, friction material section 56 is disposed adjacent to front cover surface 25a while friction material section 57 is adjacent to piston outer portion 46. As will be discussed in greater detail below, sufficient clearance remains between friction material 56, 57 and their respective surfaces 25a, 46 to allow the piston 42 to freely rotate (i.e., without any direct physical contact) relative to the drive member 50 prior to a lock-up state.

It should be appreciated that the surface of outer portion 46 and the inner surface 25a that are adjacent to a section of friction material are preferably conditioned for intermittent frictional mating with the friction material by conventional processes, such as polishing or grinding.

Figure 3:
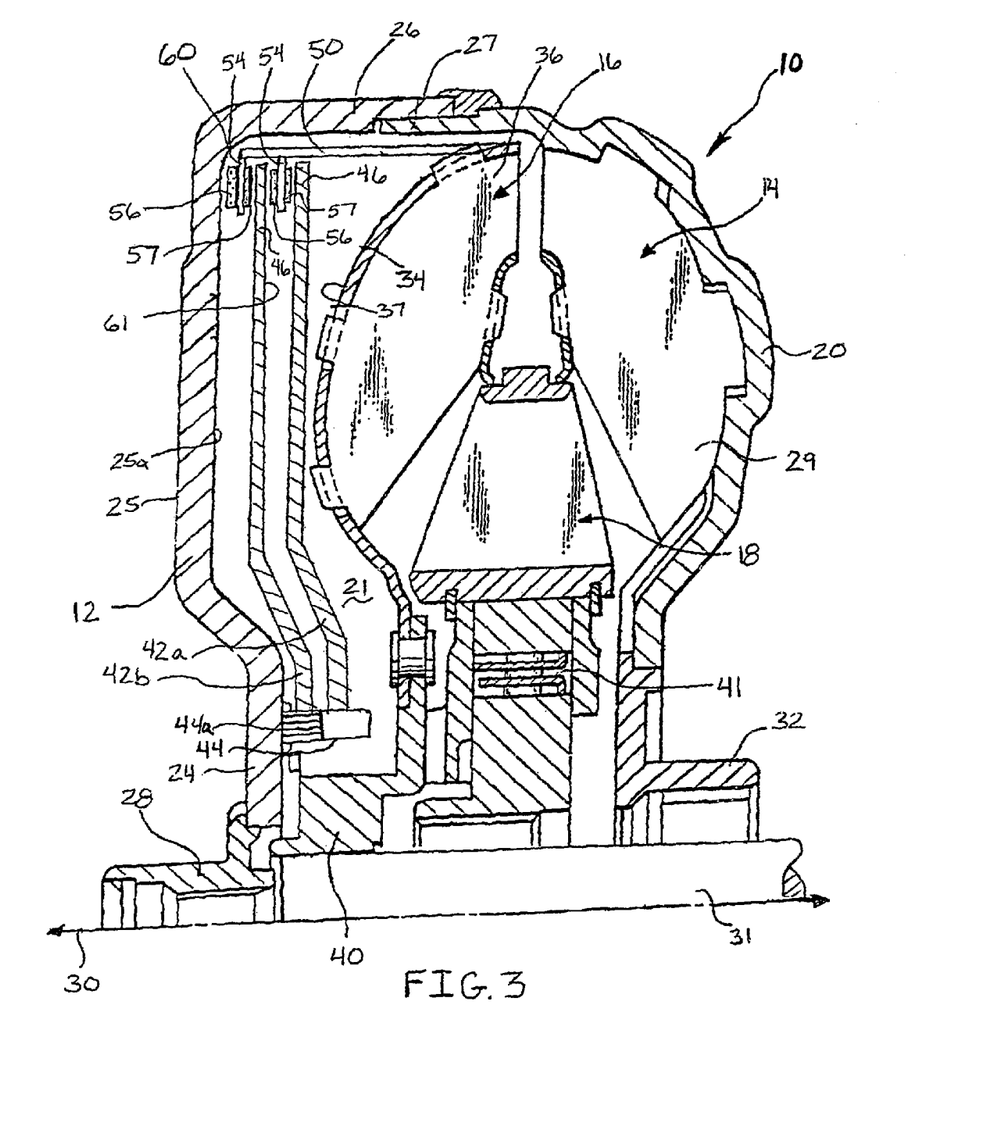
FIG. 3 is a partial cross-sectional view of an alternate embodiment of the torque converter having a four disk clutch.
Figure 4:
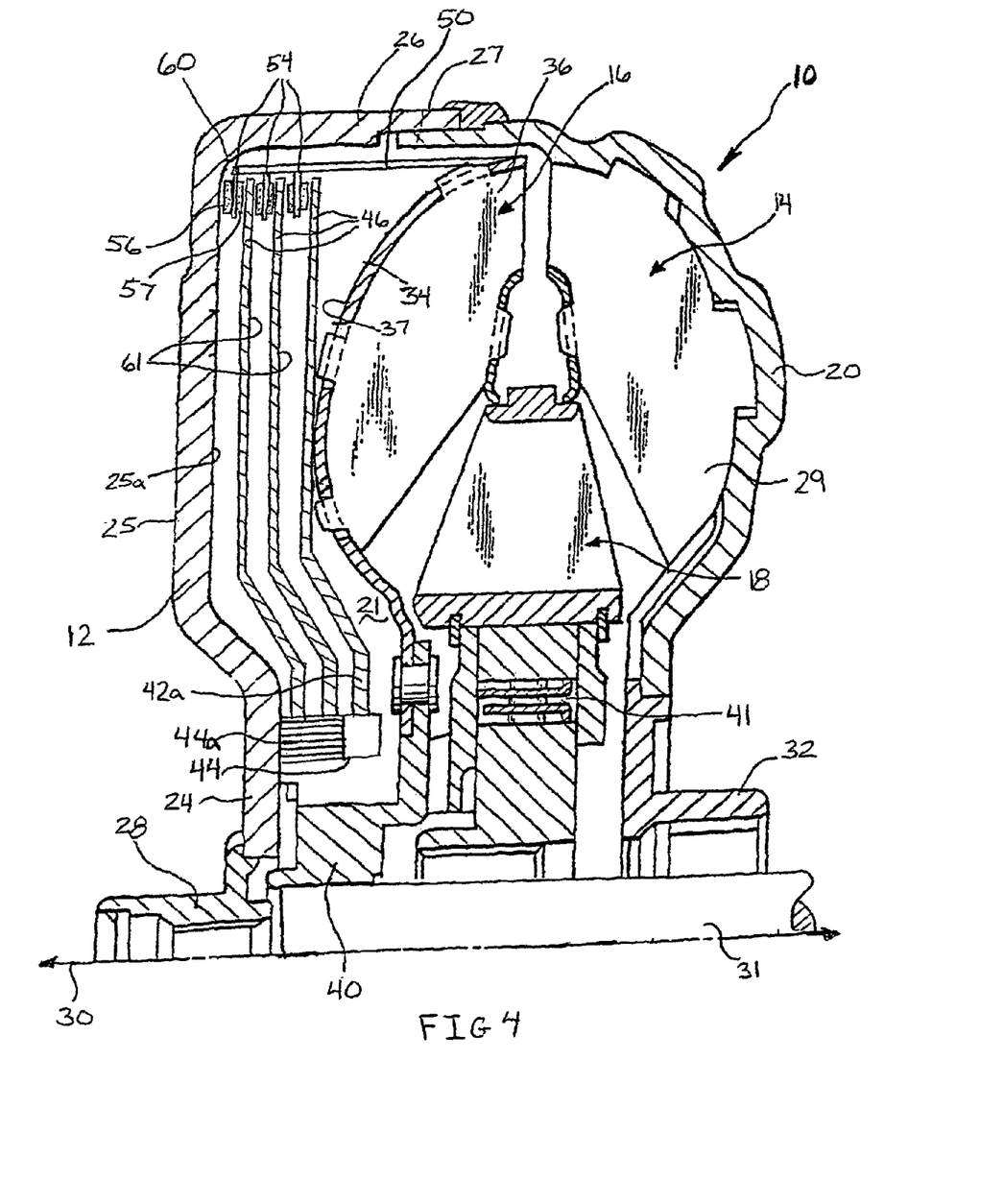
FIG. 4 is partial cross-sectional view of another alternate embodiment of the torque converter having a six disk lock-up clutch.

As illustrated in FIGS. 3 and 4, multiple load pistons 42 may be mounted to front cover 12, while drive member 50 includes a complementary number of friction plates 54. In these embodiments, each piston (e.g., piston 42b in FIG. 3) located between the furthest rearward piston 42a and the front cover 12 is sandwiched between parallel sections 56, 57 of friction material mounted on adjacent friction plates.

In torque converter 10, like substantially all conventional torque converters, increasing the internal fluid pressure within chamber 21 results in the ballooning or outward expansion of the front cover 12. This expansion occurs in both the radial direction (i.e., outer peripheral wall 26 deforms radially outwardly) and the axial direction (i.e., front wall 25 deforms to the left in FIG. 1). This deformation initially occurs elastically and eventually, if internal pressure is too high, plastically.

In operation, the input shaft (engine crankshaft) rotates front cover 12 and impeller 14. Load piston 42, being fixed to front cover 12 proximate to hub 28, also rotates with the input shaft. As in a conventional torque converter, rotation of impeller 14 causes the power transmission fluid to rotate the turbine 16 which rotates the output shaft 31 (transmission input shaft).

This rotation of the torque converter 10 inherently causes the fluid pressure within the torque converter (e.g., within chamber 21) to increase due to centrifugal force of the fluid being directed radially away from axis 30. This pressure is applied against the outer walls of the torque converter, such as front cover 12. As the torque converter 10 is rotated at higher and higher speeds, this increases the internal pressure within the torque converter. This increased internal pressure exerts an outward force on the front cover 12 and causes the front cover to balloon or expand. This expansion initially occurs within the elastic range of the front cover material and then, at too high of internal pressures, plastically. It should be appreciated that deformation in the elastic range will result in the front cover to return to its pre-ballooning size and shape once the internal pressure drops (i.e., once the RPMs of the torque converter are reduced or the charge pressure from the transmission is decreased).

Figure 5:
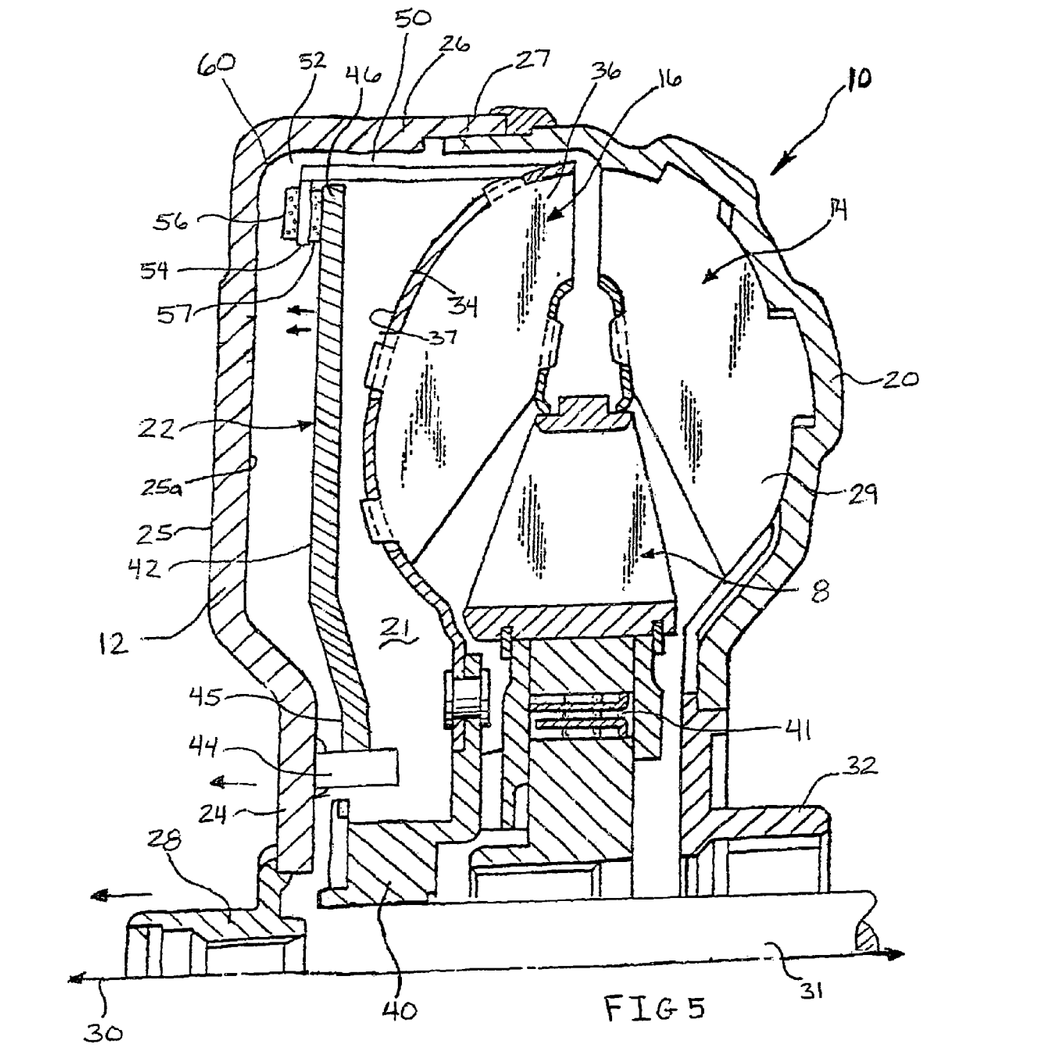
FIG. 5 is a diagram illustrating the relative expansion of a torque converter front cover due to increased internal pressure.

As best shown in FIG. 5, where the front cover 12 is illustrated an exemplary ballooned or expanded position, the expansion of the front cover 12 in the axial direction (i.e., parallel to axis 30), is greater at the central hub 28 than it is proximate to the outer peripheral wall 26. This increased deformation is a result, in part, of the cantilevered relationship of the front wall 25 relative to the outer peripheral wall 26. The intersection point or corner 60 between the outer wall 26 and front wall 25 operates as a moment arm or pivot point whereby the axial deflection of front wall 25 proximate to the hub 28 (furthest from the pivot point) is much larger than the deflection of the front wall near the outer wall 26.

Fixing the load piston(s) 42 to the front cover 12 proximate to hub 28 ensures that upon any expansion of the front cover will result in the piston moving axially in the same direction as the expansion (to the left in FIGS. 1, 3, and 4). The outer portion 46, due to the cantilevered mounting of load piston 42 to the front cover, moves axially substantially the same distance as the inwardly mounted projection 44.

Once the internal pressure within chamber 21 is large enough, this axial deflection of outer portion 46 will result in the polished surface of outer portion 46 to abut the corresponding section of friction material 57. Initially, these mating clutch surfaces 46, 57 slip, but as the internal pressure increases, clutch 22 will mechanically lock-up, thereby resulting in the front cover and turbine to rotate at a 1-to-1 ratio. In the preferred embodiment, clutch engagement resulting in lock-up occurs at engine RPMs greater than the stall speed of the torque converter.

With respect to the lock-up clutches illustrated in FIGS. 3 and 4, the axial deflection of portion 46, 146 in each piston 42, 142 will also result in the deflection of the friction plates 54 such that the forward section 56 of friction material mounted to each friction plate will engage the rearward surface 61 of the outer portion of the adjacent piston. In the preferred embodiment, the rearward-most piston 42 carries the entire load in these multiple disk clutches. The other pistons 142 carry torque and axially slide along a splined portion 44a on hub 44.

Additionally, the axial deflection of outer portion 46 and its mated friction plates 54 (i.e., the mating friction surfaces of clutch 22) is inherently greater than the expansion of the portion of the front cover that is proximate to the outer peripheral wall 26. This increased deflection of the friction plates 54 results in the forward-most section of friction material 56 (i.e., the section 56 adjacent to the front wall 25) to frictionally abut and mate with the inner surface 25a, thereby further locking the turbine to the front cover. In other embodiments, drive member 50 slides axially with the deflecting piston 22, rather than deflecting due to the force exerted by piston 42.

Further, this frictional mating of the clutch piston 42 to the outer portion of the front cover 12 braces the front cover. This mechanical locking of the front cover 12, piston 42, projection 44, drive member 50, and turbine 16 creates a robust, interlocked system where the selective locking of the clutch 22 causes the piston 42 to function as an internal anti-ballooning plate. One benefit of this internal anti-ballooning bracing is reduced crank thrust.

Figure 6:
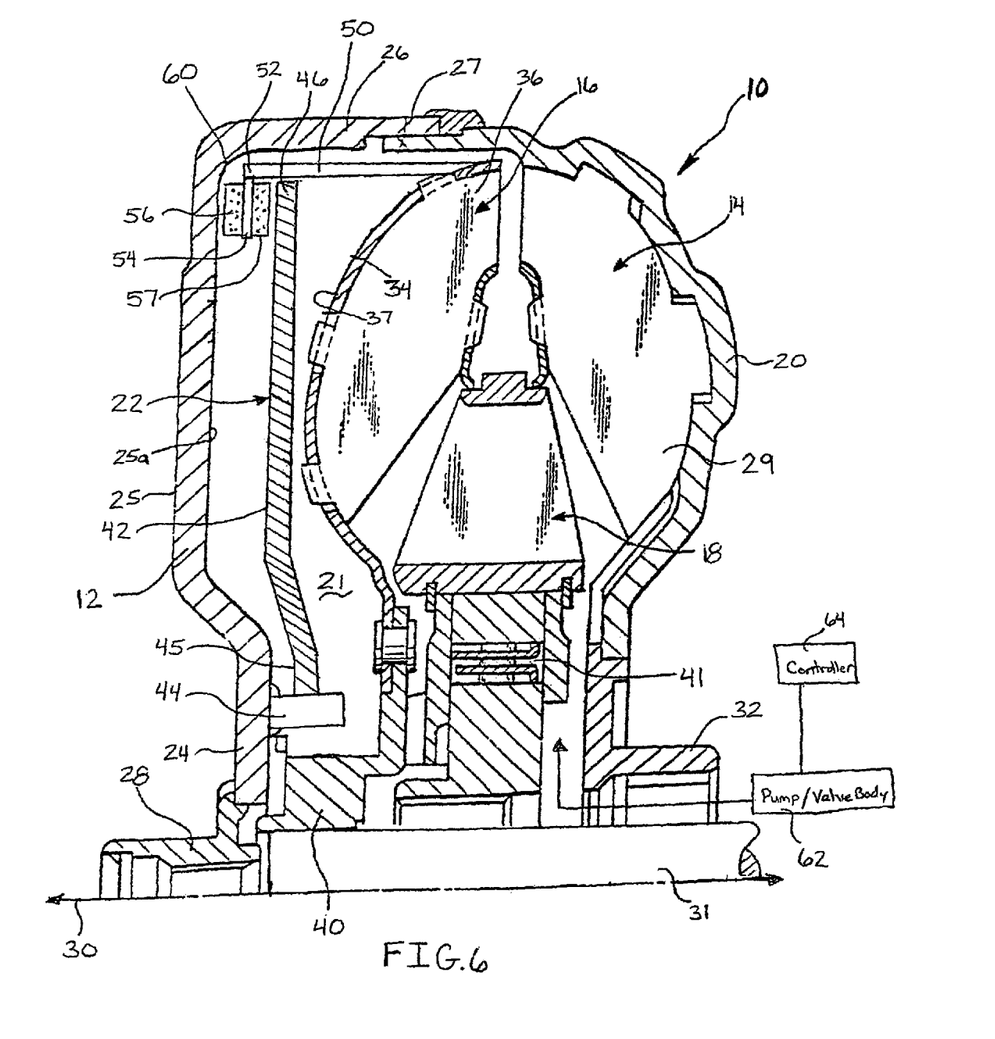
FIG. 6 is partial cross-sectional view of still another alternate embodiment of the torque converter having a controller adapted to vary the input pressure within the torque converter.

In another alternate embodiment of this invention, shown in FIG. 6, the internal pressure within a torque converter 10 can be selectively increased or bolstered by the conventional torque converter drive fluid charge pressure pump or valve body 62. In this embodiment, a controller 64 directs pump 62 to increase the internal charge pressure within chamber 21 to cause the front cover 12 to balloon and lock-up the torque converter 10. Controller 64 is preferably an automatic control circuit, such as the power-train control module (PCM). Controller 64 selectively increases the internal pressure within chamber 21 to lock-up the torque converter based on driving conditions, such as vehicle speed, engine load, engine RPMs, etc. In these embodiments, the controller 64 may limit the lock-up condition to only occur when the transmission is in high gear (e.g., $3^{rd}$ gear in a three speed) or may fully lock or partially lock the clutch 22 in each or any gear. In an alternate embodiment, controller 64 may be a manual switch that the driver can activate to direct the pump or valve body 62 to balloon the front cover 12 and lock-up the clutch 22.

In one hydraulic controlled embodiment, the clutch clearance (gap between adjacent clutch friction surfaces) is greater than the ballooning deflection caused by rotation only at or above stall speed, such that the torque converter operates like a non-lock-up torque converter. Controller 64 can supplement the internal pressure by boosting charge pressure to further balloon the front cover 12 and selectively lock-up the clutch 22.

Figure 7:
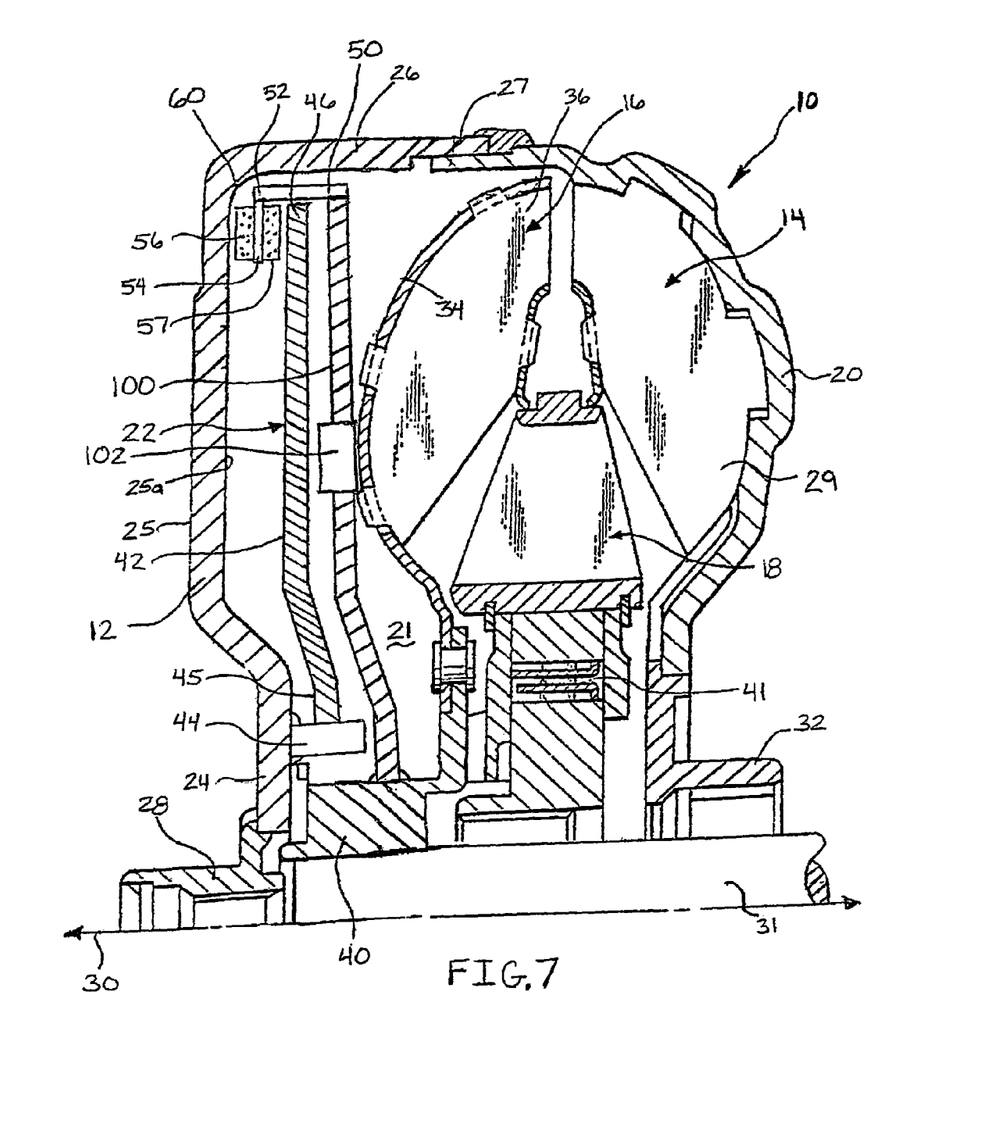
FIG. 7 is a partial cross-sectional view of yet another alternate embodiment of the torque converter having a vibration damper.

In another embodiment illustrated in FIG. 7, torque converter 10 may include a damper 100, which is fixed to the turbine hub 40 or turbine output shaft 31. In this embodiment, drive member 50 is fixed to damper 100 rather than to turbine shell 34. This damper includes a spring set 102 along its radially projecting length which absorbs and damps engine torsion and vibration to increase vehicle "drive-ability".

It should be appreciated that various modifications may be incorporated into the present invention. For example and without limitation, the radially extending piston plate(s) 42 may include vent holes along its length to ensure proper fluid distribution within chamber 21.

Because clutch 22 relies on torque converter ballooning to actuate the mechanical lock-up and does not require additional fluid circuits, it may be readily installed within conventional torque converters that do not have a lock-up clutch. In certain situations, however, the internal pressure will not be high enough to cause the front cover to expand enough to enable clutch lock-up. To facilitate lock-up, the front cover may be slightly weakened by thinning the material of the front wall 25 between corner 60 and projection 44 to increase deflection or load on load piston 42.

The invention has been described in an illustrative manner, and it is to be understood that the terminology, which has been used, is intended to be in the nature of words of description rather than of limitation. It is to be understood that the invention is not limited to the exact construction or method which has been illustrated and discussed above, but that various changes and modifications may be made without departing from the spirit and the scope of the invention as is more fully delineated in the following claims.

Having described my invention, I claim:

1. A lock-up clutch for a torque converter having a turbine and a housing front cover that is fixedly coupled to an impeller, wherein the front cover elastically expands proportional to an internal fluid pressure, said lock-up clutch comprising:
   a drive member which is fixedly coupled to said turbine;
   a load piston coupled to an inner surface of the front cover proximate to a central crank hub of the front cover, said piston extends radially outward; and
   means for selectively and frictionally coupling said piston to said drive member, wherein the front cover elastic expansion causes the load piston to translate to engage said drive member.

2. A lock-up clutch as defined in claim 1 further comprising control means for selectively boosting the internal fluid pressure within the torque converter.

3. A lock-up clutch as defined in claim 1 wherein said coupling means further frictionally couples said drive member to said front cover.

4. A lock-up clutch as defined in claim 1 wherein said drive member includes a first end which is fixed to the turbine and a second end which is proximate to said front cover.

5. A lock-up clutch as defined in claim 1 further comprising a piston mounting projection that is fixed to said inner surface proximate to said crank hub, wherein said load piston is cantilevered from said projection.

6. A lock-up clutch as defined in claim 1 wherein the front cover includes a peripheral outer wall and wherein said load piston is fixed to said front cover at a first end and has a second end that is proximate to said outer wall.

7. A lock-up clutch as defined in claim 6 wherein said coupling means is mounted to said drive member parallel and adjacent to said second end of said load piston.

8. A lock-up clutch as defined in claim 2 wherein said control means selectively controls a torque converter hydraulic fluid inlet means.

9. A lock-up clutch as defined in claim 1 further comprising:
   at least one second load piston that is also fixed to said front cover proximate to said crank hub, wherein said second load piston runs parallel to the other load piston;
   wherein said coupling means further frictionally mates said at least one second load piston to said drive member.

10. A lock-up clutch as defined in claim 1 further comprising damper means which absorb vibrations within said torque converter, said damper means is fixed to said turbine, wherein said drive member is fixedly coupled to said turbine through said damper means.

11. A method of locking a torque converter's impeller to its turbine, comprising the steps of:
   providing a torque converter having an outermost housing comprising a front cover and an impeller outer shell which cooperatively define a torque converter pressure chamber;
   fixing a cantilevered load piston to an inner surface of said front cover proximate to a central axis, wherein said load piston projects radially toward an outer wall of the torque converter housing;
   fixing a drive member to the turbine within the torque converter pressure, chamber; and
   increasing the fluid pressure within the torque converter pressure chamber to cause the front cover to expand, whereby said expansion causes said load piston to frictionally mate with said drive member.

12. The method defined in claim 11 wherein the step of increasing the fluid pressure comprises rotating said torque converter to create centrifugal fluid pressure within the torque converter pressure chamber.

13. The method as defined in claim 12 wherein the step of increasing the fluid pressure further comprises increasing torque converter charge pressure.

14. The method as defined in claim 11 further comprising the step of providing complementary friction surfaces on said drive member and said load piston proximate to said outer wall.

15. The method as defined in claim 11 wherein said expansion further causes said load piston to frictionally mate with said front cover proximate to said outer wall, thereby supporting said front cover and limiting said expansion.

16. The method as defined in claim 11 further comprising the step of increasing deflection and load of the load piston by weakening said front cover between said outer wall and where said load piston is fixed to the front cover.

17. A method of mechanically locking a torque converter having a housing front cover and turbine, comprising the steps of:
   mounting a drive member to the turbine;
   mounting a load piston to the front cover to a mounting projection that is fixed to the front cover proximate to an inner hub, wherein the load piston is supported only at said mounting projection; and
   ballooning the torque converter such that said front cover translates away from said turbine and said load piston travels with said front cover and frictionally mates with said drive member.

18. A lock-up clutch for a torque converter having an outermost housing comprising an impeller outer shell and a front cover which cooperate to define a hydraulic pressure chamber containing a turbine, said front cover including a front wall and an annular peripheral wall depending from an outer edge of said front wall and projecting toward said impeller outer shell, wherein the front cover elastically expands proportional to an internal fluid pressure within said pressure chamber, said lock-up clutch comprising:
   a drive member which is fixedly coupled to said turbine;
   a load piston coupled to an inner surface of the front wall proximate to a central crank hub of the front cover, said piston extends radially outward with a substantially flat front surface facing toward said inner surface; and
   means for selectively and frictionally coupling said piston to said drive member when the front cover expands and said load piston translates with the front cover toward said drive member.

19. A lock-up clutch as defined in claim 18, wherein said means for selectively and frictionally coupling said piston to said drive member comprises:
   a friction plate projecting from said drive member parallel to a radially distal end of said piston, wherein the friction plate includes a friction surface which faces and is adjacent to said front surface.

* * * * *